G. T. KINNEY.
CLAMP FOR TIRE CHAINS.
APPLICATION FILED JAN. 18, 1919.
1,309,635.
Patented July 15, 1919.
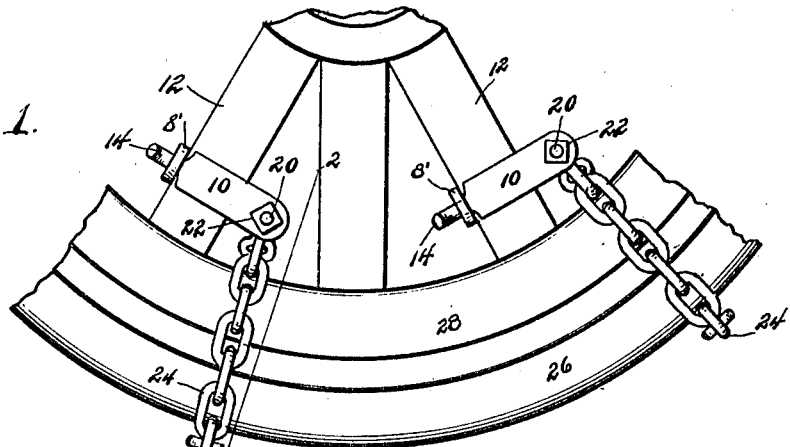
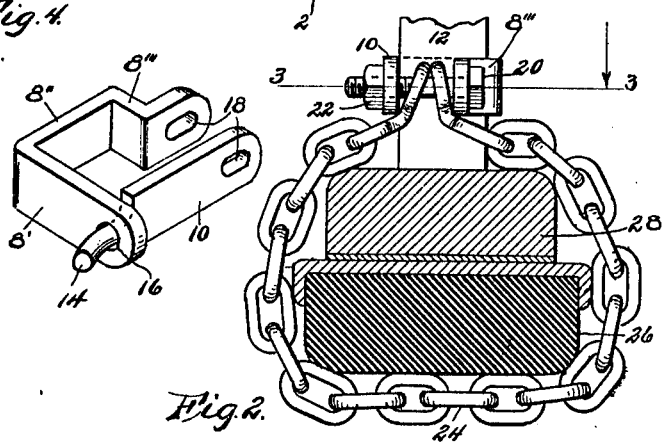
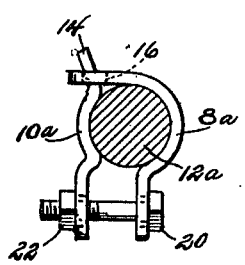
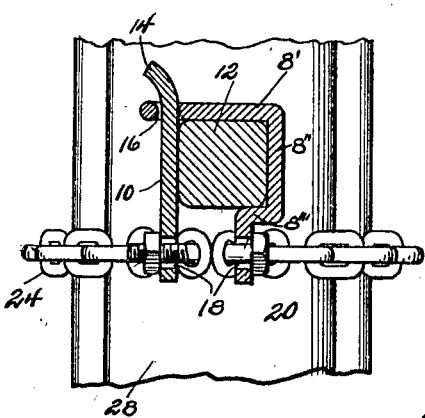
WITNESS:
R. L. Hamilton
INVENTOR.
Geo. T. Kinney,
BY Chas. W. Gerard
ATTORNEY
THE COLUMBIA PLANOGRAPH CO., WASHINGTON, D. C.

UNITED STATES PATENT OFFICE.

GEORGE T. KINNEY, OF KANSAS CITY, MISSOURI.

CLAMP FOR TIRE-CHAINS.

1,309,635.  Specification of Letters Patent.  Patented July 15, 1919.

Application filed January 18, 1919. Serial No. 271,768.

*To all whom it may concern:*

Be it known that I, GEORGE T. KINNEY, a citizen of the United States, residing at Kansas City, in the county of Jackson, State of Missouri, have invented a certain new and useful Improvement in Clamps for Tire-Chains, of which the following is a specification.

The present invention relates to tire chain retaining devices, and aims to provide a novel form of attachment adapted to be placed in clamping engagement with the spokes of vehicles wheels for securing the anti-skid chains which are commonly applied to the tires of such wheels.

To this end I provide a device which comprises a pair of spoke clamping members having detachably interengaging portions and provided with a single bolt for clamping these parts to the spoke and at the same time retaining the tire chain in its position on the wheel.

It is also sought to devise a cheap and simple form of construction, of a minimum number of parts which may be applied to the wheel or detached therefrom with the least trouble and loss of time.

With this general object in view the invention will now be described with reference to the accompanying drawing illustrating one form of construction which has been devised for embodying the proposed improvement, after which the novel features therein will be set forth in the appended claims.

In the drawing—

Figure 1 is a side elevation of a portion of a vehicle wheel having applied thereto a pair of tire chain retaining clamps embodying the present improvement;

Fig. 2 is a transverse section taken on the line 2—2 of Fig. 1;

Fig. 3 is a section taken on the line 3—3 of Fig. 2;

Fig. 4 is a perspective view showing a pair of the spoke-clamping members;

Fig. 5 is a sectional view similar to Fig. 3, but showing a modified form of the spoke-clamping members suited to a different form of spoke; and Fig. 6 is a plan view illustrating the end portions of the type of chain employed in connection with the device.

Referring to the drawings in detail, this illustrates the device as comprising a pair of spoke clamping members 8 and 10, adapted for embracing opposite sides of one of the spokes 12 of a vehicle wheel. Figs. 1 to 4 show the device as constructed for a spoke of rectangular cross-section, in which case the clamping member 8 is made somewhat pocket-shaped, having an end portion 8' embracing what may be termed the front side of the spoke, an intermediate portion 8'' embracing the inner side of the spoke, and a shoulder 8''' extending partially across the rear side of the spoke, thus snugly pocketing the spoke within the clamping member 8. The members 8 and 10 are detachably interengaged by forming a terminal finger portion 14 on one end of the member 10, which finger is adapted to be received loosely within an opening 16 provided in the outer end of the end portion 8' of the member 8 when the part 10 is applied to the outer face of the spoke 12. The other ends of the members 8 and 10 project in spaced parallel relation as represented in Figs. 3 and 4, and are provided with elongated bolt openings 18 for the mounting of a bolt 20 having the nut 22, whereby the device is securely clamped to the spoke 12.

The tire chain 24, which encircles the tire 26 and felly 28 in the usual manner, is connected to the intermediate portion of the bolt 20 between the ends of the members 8 and 10, the terminal links of said chain 24 being approximately 8-shaped and also bent as shown in Fig. 2, which facilitates the proper attachment of the ends of said chain in correct position.

Fig. 5 illustrates the application of the device to a spoke 12ᵃ of circular cross-section, in which case the clamping members 8ᵃ and 10ᵃ are simply shaped to the proper curved contour to conform to the opposite sides of the spoke, the detachable interengaging feature remaining exactly the same, and the opposite ends of the clamping members being also bolted in the same manner as before.

It is thus apparent that a simple and efficient device is provided for carrying out the desired object of the invention. Only one bolt is required for connecting the clamping members 8 and 10, the detachably interengaging connection formed by the finger 14 and opening 16 coöperating with said bolt for effecting the required clamping engagement with the spoke. Obviously the parts may be conveniently and quickly applied to the spoke and secured in place simply by the tightening of the single bolt. The elongated form of the openings 18 permits the necessary clearance for the bolt in adjusting the same, in case the terminals of the members 8 and 10 do not project in exactly parallel relation. The improved structure is of particular advantage in facilitating the speedy repair or renewal of the chains; and, when the chains are left off, the clamping parts may be simply allowed to remain on the spokes until it is desired to replace the chains in position.

Having described the invention, what I claim as new and desire to secure by Letters-Patent is:

1. A clamping device for attaching tire chains to vehicle wheels, comprising a pair of spoke clamping members for engaging opposite sides of a spoke, said members being formed with detachably interengaging end portions at one side of the spoke, and a bolt detachably engaging the terminal links of the tire chain and also detachably connecting the other end portions of said clamping members and thereby coöperating with said interengaging end portions of said members to clamp the device to the spoke.

2. A clamping device for attaching tire chains to vehicle wheels, comprising a pair of spoke clamping members for engaging opposite sides of a spoke, one of said members being formed with an end opening and the other of said members being formed with a terminal finger adapted for detachable engagement with said opening, and a chain retaining bolt connecting the other ends of said members, whereby the device is clamped to the spoke.

3. A clamping device for attaching tire chains to vehicle wheels, comprising a pair of spoke clamping members for engaging opposite sides of a spoke, one of said members being formed with an end opening and the other of said members being formed with a terminal finger adapted for detachable engagement with said opening, the other ends of said members being each provided with an enlarged bolt opening, and a chain retaining bolt extending through said bolt openings, whereby the device is clamped to the spoke.

In witness whereof I hereto affix my signature.

GEO. T. KINNEY.

Copies of this patent may be obtained for five cents each, by addressing the "Commissioner of Patents, Washington, D. C."